R. J. EVANS.
RUBBER TIRE FOR VEHICLES.
APPLICATION FILED AUG. 14, 1915.

1,285,084.

Patented Nov. 19, 1918.

Inventor
Richard J. Evans,
by W. B. Corwin,
Attorney

UNITED STATES PATENT OFFICE.

RICHARD J. EVANS, OF FRANKLIN, PENNSYLVANIA.

RUBBER TIRE FOR VEHICLES.

1,285,084.  Specification of Letters Patent.  Patented Nov. 19, 1918.

Application filed August 14, 1915. Serial No. 45,469.

*To all whom it may concern:*

Be it known that I, RICHARD J. EVANS, a citizen of the United States, residing at Franklin, in the county of Venango and State of Pennsylvania, have invented a new and useful Improvement in Rubber Tires for Vehicles, of which the following is a specification.

My invention relates to rubber tires for vehicles and particularly to pneumatic tires therefor consisting of an inner air tube and an outer inclosing shoe or casing. Heretofore, such tires or casings have ordinarily been provided with layers of canvas or ducking, preferably made of sea island cotton, incorporated with and embedded in the body of the rubber tire for the purpose of reinforcement and to some extent to resist puncture; but tires so constructed have been found to possess various objections and disadvantages owing to the natural tendency of the canvas or ducking to disintegrate or rot, which is aided in many cases by the injury to the cotton by the heat, steam, sulfur, or other substances employed in the vulcanizing operation, and by the access of water or moisture thereto when in use.

My present invention is designed to obviate such objections and disadvantages, and consists in employing in the fabric portion of the casing, termed the carcass, and as part thereof, preferably the outermost part, a layer or layers of asbestos in woven or other fabric form which surround the remaining layers of fabric which are composed usually of sea island cotton in woven or other fabric form. This layer or layers of asbestos fabric protects the sea island cotton or other fabric from heat, steam, sulfur, or other substances used in the vulcanizing operation, and from scuffing and rot and moisture when in use.

A further object of the invention is to produce a puncture-proof or non-puncturable tire, which is accomplished by applying at the tread on the outside of the rubber layer covering the cotton and asbestos carcass what I shall designate as a breaker-strip composed of woven asbestos cloth having fine brass, copper, or other metal wires running through the centers of the strands composing the same. On the exterior of this breaker-strip an outer layer of rubber is applied. It will be understood that the whole structure is suitably vulcanized into one concrete structure.

Figure 1:
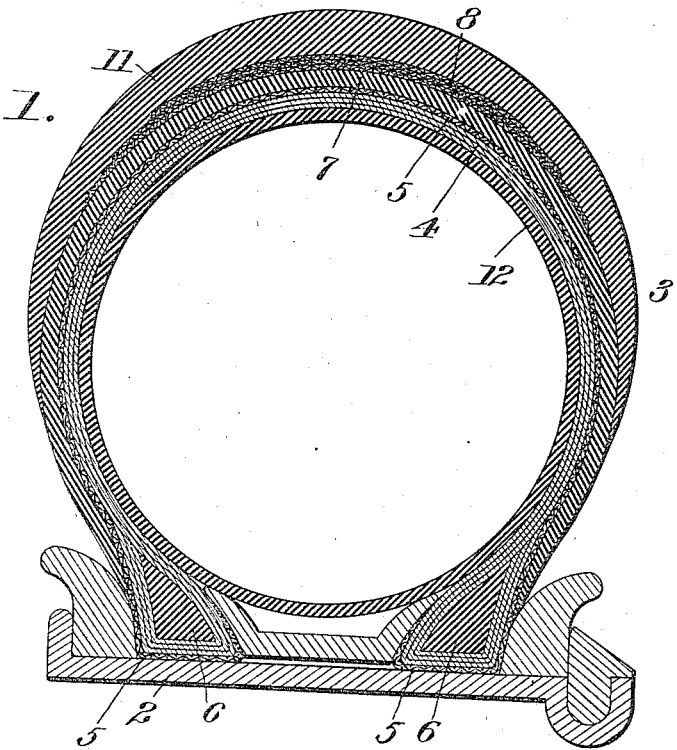
Figure 2:
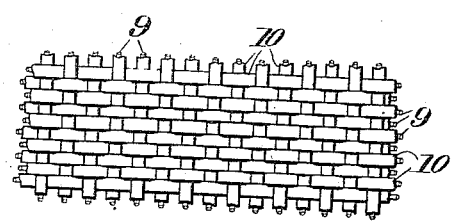
Figure 3:
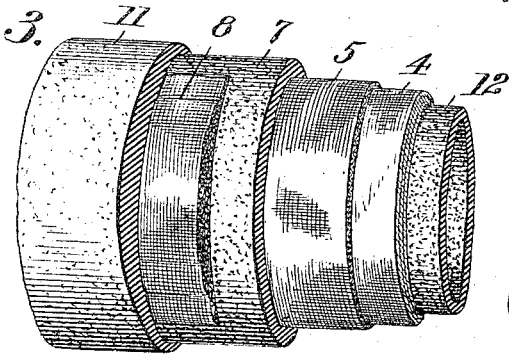

In the accompanying drawing forming part of this specification and in which similar symbols of reference indicate similar parts, Figure 1 represents in cross-section a tire embodying my invention; Fig. 2 is a fragmentary view of the metallically-reinforced asbestos cloth employed for the breaker-strip; and Fig. 3 is a perspective view of the tire showing the several layers broken away with their ends appearing in section.

In the drawing, 2 represents a conventional form of vehicle rim and 3 the rubber shoe or casing held by the same. The shoe or casing 3 is composed of a vulcanized rubber body having embedded therein and incorporated therewith a carcass composed preferably of superposed layers 4 of sea island cotton in woven or other fabric form having incorporated therewith and preferably forming the outermost portion thereof a layer or layers 5 of asbestos in woven or other fabric form. The layers of cotton fabric entirely envelop and the layer of asbestos fabric partially envelops the beads 6 of the tire. On the exterior surface of the layer of asbestos fabric 5 is applied a layer of rubber 7. On the outer surface of this layer of rubber and extending across the tread portion of the tire is the breaker-strip or puncture-preventing strip 8, composed of one or more layers of woven asbestos cloth, having, as before stated, fine brass, copper, or other metal wires 9 running through the centers of the individual strands 10 composing the same. 11 is the outermost layer of rubber of the tire. 12 is the ordinary inner tube of a pneumatic tire.

It will be understood that the sea island cotton portion 4, the asbestos portion 5, and the breaker-strip 8 may be composed of one, two, three, or as many layers or plies as may be deemed preferable or desirable. It will also be understood that the parts 4, 5, 6, 7, 8, and 9, are suitably vulcanized together to form an integral concrete unitary structure.

My improved tire thus constructed will be found to have many advantages not possessed by the tires now in common use. It is much more durable than the ordinary tire, as the asbestos fabric layer on the exterior of the layers of cotton fabric prevents access of moisture or other deleterious substances to the cotton fabric when the tire is in use, and also protects the cotton fabric from injury by heat, steam, sulfur, or other substances employed in the vulcanizing operation, the asbestos fabric being unaffected by said substances and capable of withstanding attack by any material connected with the manufacture or use of rubber vehicle tires.

It will be readily apparent that my improved tire can be retreaded an indefinite number of times without injury to the same.

In employing the word "fabric" in the foregoing specification and following claims in connection with the cotton and asbestos layers, I do not wish to be understood as limiting my invention to cotton and asbestos in woven form, as these materials may be employed in any desired or preferred form, excepting in their loose state.

I claim:—

1. A hollow tire having a bead at each of its inner circumferential edges, in combination with a carcass structure the inner portion of which is formed of woven vegetable fabric which completely envelops said beads and the outer portion of which is formed of woven asbestos cloth and partially envelops said beads and covers said vegetable fabric, and an outer layer of rubber, the entire structure being vulcanized together into a unitary structure.

2. A tire casing comprising an outer rubber tread portion and an inner carcass portion vulcanized thereto, said carcass portion consisting of inner layers of reinforcing cotton fabric and an outer heat insulating asbestos fabric immediately adjacent thereto.

In witness whereof I have hereunto set my hand.

RICHARD J. EVANS.

Witnesses:
J. R. GRUNDY,
ELMER C. DAVIS.